United States Patent [19]

Hauser

[11] 4,257,815

[45] Mar. 24, 1981

[54] AIR ENTRAINING MORTAR AND PROCESS OF MANUFACTURE

[75] Inventor: Karl V. Hauser, Ann Arbor, Mich.

[73] Assignee: Edw. C. Levy Co., Detroit, Mich.

[21] Appl. No.: 57,345

[22] Filed: Jul. 13, 1979

[51] Int. Cl.³ .............................................. C04B 7/02
[52] U.S. Cl. ...................................... 106/98; 106/118; 106/121; 106/DIG. 1
[58] Field of Search .................. 106/98, DIG. 1, 118, 106/121

[56] References Cited

U.S. PATENT DOCUMENTS

| | | | |
|---|---|---|---|
| 1,942,769 | 1/1934 | Peffer et al. | 106/DIG. 1 |
| 2,250,107 | 7/1941 | Nelles | 106/98 |
| 2,803,556 | 8/1957 | Carlsson et al. | 106/98 |
| 3,117,882 | 1/1964 | Herschler et al. | 106/98 |
| 3,565,648 | 2/1971 | Mori et al. | 106/98 |
| 3,832,196 | 8/1974 | Broussard et al. | 106/98 |
| 3,852,084 | 12/1974 | Webster et al. | 106/DIG. 1 |
| 4,018,619 | 4/1977 | Webster et al. | 106/DIG. 1 |
| 4,084,381 | 4/1978 | Cain et al. | 106/DIG. 1 |

*Primary Examiner*—James Poer
*Attorney, Agent, or Firm*—Harness, Dickey & Pierce

[57] ABSTRACT

A process and composition of matter for the treatment of mortar or concrete which includes fly ash containing carbon, for the purpose of increasing air entrainment. A small quantity of a soluble alkaline earth oxide is added to the mortar or concrete at the time of mixing. The material is added in form which is immediately available to inhibit the air-adsorptive properties of the carbon in the fly ash.

18 Claims, No Drawings

AIR ENTRAINING MORTAR AND PROCESS OF MANUFACTURE

BACKGROUND OF THE INVENTION

1. Field of the Invention

The invention relates to the manufacture of mortar or concrete which includes a fly ash containing carbon and an air entraining chemical admixture which is intended to create tiny air voids in the concrete to allow for the expansion of freezing water.

2. Description of the Prior Art

Fly ash from pulverized coal fired boilers is a "pozzolan" long used with cement, sand, gravel, air entraining chemicals and water to make concrete of special handling characteristics, or to reduce the amount of cement required. Boiler operating characteristics generally leave varying amounts of carbon in the fly ash. High carbon fly ash, with a carbon content of over 5%, is generally considered unsatisfactory for use in concrete because it tends to lower air entrainment. The small air bubbles formed in the mixing and then retained for several hours after pouring of the concrete are necessary in most parts of the United States to allow for the expansion of freezing water to counteract freeze/thaw scaling problems.

One way of trying to overcome this problem is to mix in an excess amount of the air entraining agent. Even in this event however another problem arises during transportation of the product.

This problem is that of maintaining air entrainment in the concrete during its travel from the mixer to the final placement. Loss of entrained air could occur even if there is little or no fly ash containing carbon in the mixture but the loss is more serious with high carbon fly ashes.

A search of the prior art has revealed Patent No. 2,880,101 to Ulfstedt relating to the manufacture of steam cured light aggregate concrete by adding burnt magnesia or dolomite. However, the starting materials as well as the end purpose and product in the Ulfstedt patent are different than that of the present invention. Ulfstedt is concerned with the manufacture of lime silica brick which tends to shrink during steam curing. The slow hydrating burnt magnesia which Ulfstedt adds to the concrete mixture is relatively insoluble and would be unsuitable for use in the present invention which requires a soluble alkaline earth oxide which is immediately hydrated in the mix.

Burley U.S. Pat. No. 4,011,094 shows a composition for patching or grouting which includes magnesium oxide or magnesium hydroxide to provide sag resistance.

The following patents disclose the manufacture of light weight concrete by adding calcium oxide per se, calcium oxide in the form of a burnt clinker or as a mixture of calcium oxide and magnesium oxide to the concrete composition:

| | |
|---|---|
| 3,470,005 | 3,884,710 |
| 3,785,844 | 3,558,526 |

The following patents depict the manufacture of hydraulic cements containing calcium oxide as an additive:

| | |
|---|---|
| 2,947,643 | 3,066,031 |

The following patents are submitted as of general interest:

| | |
|---|---|
| 2,250,107 | 4,047,962 |
| 2,476,306 | 4,101,332 |
| 2,517,993 | 1,006,725 |
| 4,018,617 | 1,343,929 |
| 4,108,619 | 2,502,418 |
| 4,038,095 | 2,836,502 |

None of the above listed patents are believed to suggest or disclose the presently claimed invention.

BRIEF SUMMARY OF THE INVENTION

It is an object of the present invention to provide an improved process and composition of matter which will increase the ability of mortar and concrete with fly ash containing carbon and an air entraining agent, to entrain air necessary to reduce freeze/thaw scaling problems.

It is another object to provide an improved process and composition of matter having these characteristics, which helps maintain air entrainment in concrete being transported from the mixer to final placement.

It is a further object to provide an improved process and composition of matter of this nature, which is easy and economical to carry out and uses readily available materials.

Briefly, the process of this invention includes the step of mixing a fly ash containing carbon and a soluble alkaline earth oxide in a form immediately available to inhibit the air adsorptive properties of the carbon in said fly ash. In another aspect, the invention comprises the steps of providing a mortar including at least fly ash containing carbon, cement, sand, water, an air entraining chemical admixture, and a soluble alkaline earth oxide in a quantity sufficient to inhibit the air-adsorptive properties of the carbon in said fly ash, and agitating said mixture to create air entrainment.

The composition of matter of this invention is for inclusion in a mortar and briefly comprises fly ash containing carbon and a soluble alkaline earth oxide in a form immediately available to inhibit the air adsorptive properties of the carbon in said fly ash. In another aspect, the composition of matter briefly comprises a mortar having at least fly ash containing carbon, cement, sand, water, an air entraining chemical admixture and a soluble alkaline earth oxide in a quantity sufficient to inhibit the air adsorptive of the carbon in said fly ash.

DESCRIPTION OF THE PREFERRED EMBODIMENTS

To carry out the process of this invention, a mortar or a concrete is prepared by mixing a fly ash containing carbon and a soluble alkaline earth oxide such as lime or calcium oxide, magnesium oxide or another soluble alkaline earth oxide which is either already hydrated or will be immediately hydrated in the mixture. These materials are mixed with water. The quantity of such oxides is preferably between 0.1% and 3% of the weight of the cement used, or 0.01% to 0.6% of weight of concrete.

Instead of or in addition to calcium oxide and/or magnesium oxide, the process could include a mixture of fly ash containing carbon with the hydrates of either calcium oxide or magnesium oxide. As a low cost alternative, waste dusts from the production of calcium oxide or magnesium oxide, containing soluble calcium oxide or magnesium oxide, could be mixed with the fly ash containing carbon.

In another embodiment, the process could comprise the steps of providing a mortar or concrete which includes at least a fly ash containing carbon, cement, sand, water and coarse aggregate in the case of concrete, together with an air entraining chemical admixture. The latter is available in a wide variety of commercial air entraining agents such as lignins or organics. To this mixture is added a soluble alkaline earth oxide chosen from the group described above and in a quantity sufficient to inhibit the air adsorptive properties of the carbon in the fly ash. Upon agitating this mixture to create air entrainment, the soluble alkaline earth oxide will help retain the small air voids which are created.

Any of various mixing sequences could be used in carrying out the process. In one sequence, the sand and coarse aggregate are first mixed, the cement including the fly ash containing carbon is added, and water is then added simultaneously with the air entraining agent and the soluble alkaline earth oxide. Mixing takes place during this sequence. Alternatively, the water and cement including the fly ash containing carbon could first be mixed and the sand, coarse aggregate, air entraining agent and soluble alkaline earth oxide added.

It is important in carrying out the process of this invention that the soluble alkaline earth oxide be readily hydrated. This is because the additive will have no effect after the mortar or concrete sets, in about two hours, as far as air voids are concerned.

As a composition of matter, the invention may be considered as one for inclusion in a mortar or concrete and thus comprising a fly ash containing carbon and a soluble alkaline earth oxide chosen from the above described group and in a form immediately available so as to inhibit the air adsorptive properties of the carbon in the fly ash. Alternatively, the composition of matter may comprise a mortar or concrete which, in addition to the above listed ingredients also contains cement, sand, water and an air entraining chemical admixture.

The following tests demonstrate the ability of the invention to overcome problems of air entrainment and freeze/thaw scaling.

I.

|  | Control | With CaO Additive, 2-½ lbs/cu yd |
|---|---|---|
| Lab Mix |  |  |
| Cement | 500 lbs/cu yd | 500 lbs/cu yd |
| Fly Ash (5% carbon) | 100 lbs/cu yd | 100 lbs/cu yd |
| 2NS Sand | 1150 lbs/cu yd | 1150 lbs/cu yd |
| 6A pebble | 1920 lbs/cu yd | 1920 lbs/cu yd |
| H₂O | 262 lbs/cu yd | 262 lbs/cu yd |
| Air Entraining Agent - Type | Darex | Darex |
| Amount | 25 oz/cu yd | 25 oz/cu yd |
| Initial Tests |  |  |
| Slump | 4" | 4" |
| Air | 5.8% by vol. | 8.0% by vol. |

This initial test shows that the air entrainment in the mix having the calcium oxide was substantially higher than that without this ingredient.

| Delay Tests 40 mins. | | |
|---|---|---|
| Slump | 3" | 4" |
| Air | 3.3% | 7.3% |
| Air Loss | 43% | 9% |

This delay test illustrates that the air loss is substantially less in the mixture having the additive and thus air voids were still present to a greater extent.

II.

| | Both With CaO Additive 2-½ lbs/cu yd | |
|---|---|---|
| | Regular (5% Carbon) Fly Ash | High Carbon (12%) Fly Ash |
| Lab Mixes | | |
| Cement | 500 lbs/cu yd | 500 lbs/cu yd |
| Fly Ash | 100 lbs/cu yd | 100 lbs/cu yd |
| 2NS Sand | 1150 lbs/cu yd | 1150 lbs/cu yd |
| 6A pebble | 1920 lbs/cu yd | 1920 lbs/cu yd |
| H₂O | 262 lbs/cu yd | 262 lbs/cu yd |
| AEA-Type | Darex | Darex |
| Amount | 25 oz/cu yd | 25 oz/cu yd |
| Initial Tests | | |
| Slump | 4-½% | 4-½% |
| Air | 4.8% | 6.0% |

The initial test showed that air in the mixture with the high carbon fly ash was greater than that with the regular fly ash. This anomalous result may be due to extra air entrapped as large bubbles in the fluffy carbon particles, rather than to entrainment by the air entraining agent. Entrapped air bubbles are of no benefit to concrete, and usually disappear very quickly, even before placement of the concrete.

| Delay Tests | Regular (5% Carbon) Fly Ash | High Carbon (12%) Fly Ash |
|---|---|---|
| Time | 75 mins. | 40 mins. |
| Slump | 3-¼" | 3-¼" |
| Air | 4.8% | 3.9% |
| Air Loss | 0 | 35% |

There was no air loss in the mixture containing the 5% carbon fly ash. The test showed that even with the high carbon fly ash some air entrainment was obtained using the additive. Past experience had indicated that, with this level of air entraining agent, one would not have been able to obtain air entrainment with high (12%) carbon fly ash.

III. This test was for a lower target strength concrete.

| | Control | With Additive |
|---|---|---|
| Plant Mix | | |
| Cement | 360 lbs/cu yd | 360 lbs/cu yd |
| Fly Ash | 60 lbs/cu yd | 60 lbs/cu yd |
| 2NS Sand | 1530 lbs/cu yd | 1530 lbs/cu yd |
| 6A pebble | 1800 lbs/cu yd | 1800 lbs/cu yd |
| H₂O | 275 lbs/cu yd | 275 lbs/cu yd |
| AEA-Type | Darex | Darex |
| Amount | 25 oz/cu yd | 25 oz/cu yd |
| Water Reducing Additive | 3 oz/100 lbs. | 3 oz/100 lbs. |
| Additive of Invention | None | 1.8 lbs CaO/cu yd |
| Initial Tests | | |
| Slump | 6-3/4" | 6" |
| Air | 6.9% | 7.6% |

The initial test showed substantially greater air entrainment in the mixture with the additive.

| Delay Tests | Control | With Additive |
| --- | --- | --- |
| Time | 25 mins. | 20 mins. |
| Slump | 5-½" | 5" |
| Air | 5.6% | 7.0% |
| Time | 50 mins. | 30 mins. |
| Water Added | 3.5 gals/cu yd | 3.0 gal/cu yd |
| Slump | 8-½" | 8" |
| Air | 4.6% | 6.9% |
| Time | 70 mins. | 65 mins. |
| Slump | 8-½" | 8" |
| Air | 4.2% | 6.0% |

These delay tests show that the mixture containing the additive consistently maintained air entrainment to a greater extent than the control mixture. The invention thus enables mortar or concrete to be made with a much higher carbon fly ash content than ever before.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

I claim:

1. A composition of matter comprising a mortar having at least fly ash containing carbon, cement, sand, water, an air entraining chemical admixture and a water soluble alkaline earth oxide in a quantity sufficient to inhibit the air adsorptive properties of the carbon in said fly ash and to retain air voids in said mortar.

2. A composition of matter according to claim 1, in which said water soluble alkaline earth oxide is chosen from the group comprising calcium oxide, magnesium oxide, their hydrates and waste dusts from their production which contain soluble calcium oxide or magnesium oxide.

3. A composition of matter according to claim 1, in which the quantity of said water soluble alkaline earth oxide is between 0.1% and 3% of the weight of mortar.

4. A composition of matter according to claim 2, in which the quantity of said water soluble alkaline earth oxide is between 0.1% and 3% of the weight of mortar.

5. A composition of matter according to claim 1, in which the quantity of said water soluble alkaline earth oxide is between 0.01% and 0.6% of the weight of concrete.

6. A composition of matter according to claim 2, in which the quantity of said water soluble alkaline earth oxide is between 0.01% and 0.6% of the weight of concrete.

7. The method of inhibiting adverse reduction of entrained air in hardened mortar and concrete containing high carbon fly ash due to adsorption by the latter of air during mixing thereof prior to hardening comprising adding an air entraining agent and a water soluble alkaline earth oxide to said mortar or concrete at the time of mixing.

8. The method of inhibiting adverse reduction of entrained air in hardened mortar and concrete containing high carbon fly ash due to adsorption by the latter of air during mixing thereof prior to hardening comprising adding to said mix an air entraining agent and a water soluble alkaline earth oxide, said air entraining agent being added in an amount sufficient to produce a desired proportion to air voids in the mixture and in the hardened mortar or concrete.

9. The method of inhibiting adverse reduction of entrained air in hardened mortar and concrete containing high carbon fly ash due to adsorption by the latter of air during mixing thereof prior to hardening comprising adding to said mix an air entraining agent and a water soluble alkaline earth oxide to the mixture, said alkaline earth oxide being added in an amount sufficient to inhibit adsorption by said fly ash of entrained air in said mix.

10. The method of inhibiting adverse reduction in the number and distribution of air voids in hardened mortar and concrete containing high carbon fly ash as a result of adsorption of entrained air in said mortar or concrete by said fly ash during mixing of said mortar or concrete prior to hardening comprising adding an air entraining agent and a water soluble alkaline earth oxide to said mix, said air entraining agent being added in an amount sufficient to introduce entrained, discrete, essentially fine, relatively uniformly dispersed air bubbles into the mixture and said alkaline earth oxide being added in an amount sufficient to inhibit adsorption by said fly ash of the air entrained in said mix by said agent.

11. The method defined by claim 7 wherein said fly ash contains carbon in excess of about 5%.

12. The method defined by claim 7 wherein the alkaline earth oxide is CaO.

13. The method defined by claim 7 wherein the alkaline earth oxide is added to the mix in an amount between about 0.1% and about 3% by weight of the cement used in the mix.

14. The method defined by claim 7 wherein the fly ash is present in the mix in an amount approximately 1/5 by volume of the cement in the mix.

15. The method defined by claim 7 wherein the fly ash used in the mix contains about 12% carbon and wherein the amount of fly ash present in the mix is approximately 20% by volume of the amount of cement in the mix.

16. The method defined by claim 12 wherein the amount of calcium oxide in the mix is approximately 2½% by volume of the amount of fly ash in the mix.

17. The method defined by claim 12 wherein the calcium oxide is added to the mix in an amount approximately 2½% to 3% by volume of the fly ash in the mix.

18. The method defined by claim 12 wherein the fly ash added to the mix is approximately 5% carbon, wherein the fly ash is added to the mix in an amount equal approximately to 20% by volume of the cement contained therein, and wherein the calcium oxide is added to the mix in an amount between about 2½% to 3% by volume of the fly ash contained in the mix.

* * * * *